(12) United States Patent
Kim

(10) Patent No.: US 12,175,805 B2
(45) Date of Patent: Dec. 24, 2024

(54) SYSTEM FOR MODE CONTROL OF A CONNECTED CAR SERVICE TERMINAL AND A METHOD FOR MODE CONTROL USING THE SAME

(71) Applicants: HYUNDAI MOTOR COMPANY, Seoul (KR); KIA CORPORATION, Seoul (KR)

(72) Inventor: Hyangjin Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 258 days.

(21) Appl. No.: 17/870,013

(22) Filed: Jul. 21, 2022

(65) Prior Publication Data

US 2023/0064352 A1 Mar. 2, 2023

(30) Foreign Application Priority Data

Sep. 1, 2021 (KR) .................. 10-2021-0116321

(51) Int. Cl.
*G07C 5/00* (2006.01)
*B60W 50/00* (2006.01)
*B60W 50/08* (2020.01)
*G07C 5/02* (2006.01)
*H04L 9/32* (2006.01)

(52) U.S. Cl.
CPC .......... *G07C 5/008* (2013.01); *B60W 50/082* (2013.01); *G07C 5/02* (2013.01); *H04L 9/3226* (2013.01); *B60W 2510/1005* (2013.01); *B60W 2540/047* (2020.02); *B60W 2540/06* (2013.01); *B60W 2556/45* (2020.02)

(58) Field of Classification Search
CPC ....... G07C 5/008; G07C 5/02; B60W 50/082; B60W 2540/047; B60W 2556/45; B60W 2510/1005; B60W 2540/06; H04L 9/3226
USPC ........................................... 701/31.5
See application file for complete search history.

(56) References Cited

U.S. PATENT DOCUMENTS

| | | | |
|---|---|---|---|
| 2016/0116293 A1* | 4/2016 | Grover .................. | G08G 1/005 701/23 |
| 2016/0227374 A1* | 8/2016 | Moeller ................ | H04W 4/027 |
| 2020/0283011 A1* | 9/2020 | Grossman ............ | B60W 10/08 |
| 2021/0229633 A1* | 7/2021 | DeLong ................ | B60R 25/22 |
| 2022/0089124 A1* | 3/2022 | DeLong ................ | B60R 25/31 |
| 2022/0368830 A1* | 11/2022 | Molin ..................... | H04N 5/76 |

* cited by examiner

*Primary Examiner* — Mahmoud S Ismail
(74) *Attorney, Agent, or Firm* — Lempia Summerfield Katz LLC

(57) ABSTRACT

A method controls a mode of a vehicle in a connected car service terminal and is driven by at least one processor. Driver exit information for determining a driver getting out for the vehicle is collected and whether the driver has left the vehicle based on the driver edit information is checked. A driver exit notification signal informing that the driver has left the vehicle is transmitted to a connected car service server and a valet mode in an inactivated state is activated upon receiving a valet mode activation signal of the vehicle from the connected car service server.

12 Claims, 7 Drawing Sheets

SYSTEM FOR MODE CONTROL OF A CONNECTED CAR SERVICE TERMINAL AND A METHOD FOR MODE CONTROL USING THE SAME

CROSS-REFERENCE TO RELATED APPLICATION

This application claims priority to and the benefit of Korean Patent Application No. 10-2021-0116321 filed in the Korean Intellectual Property Office on Sep. 1, 2021, the entire contents of which are incorporated herein by reference.

BACKGROUND

(a) Field

The present disclosure relates to a mode control system of a connected car service terminal that automatically switches a mode of a connected car system installed in a vehicle to a valet mode when a driver has left the vehicle. The present disclosure also relates to a mode control method using the same.

(b) Description of the Related Art

Recently, research and development of connected cars have been increasing. A connected car is a vehicle that can provide bidirectional internet service and mobile service based on the information and communications technology linked thereto.

A connected car service, which is an integrated form of telematics, infotainment, and mobile communication network technology, gradually has become popular with the spread of smart phone and expansion of mobile internet service. Currently, the connected car service is provided mainly in the form of a service that is installed in the vehicle. The connected car service is provided via a smart phone connected to the vehicle, such as media contents streaming and various application service.

A valet mode, one of the functions provided by the connected car, is a function that enhances security so that personal information of a driver is not exposed on the infotainment screen when the driver uses valet parking or valet driving. Currently, the valet mode is activated only when the driver executes the valet mode function via vehicle audio, video, navigation, telematics (AVNT). Thus, there is a danger of entirely exposing the personal information of the driver on the infotainment screen when the driver has left the vehicle without executing the valet mode function.

The above information disclosed in this Background section is only to enhance understanding of the background of the present disclosure. Therefore, the Background section may contain information that does not form the prior art that is already known in this country to a person of ordinary skill in the art.

SUMMARY

The present disclosure provides a system for controlling a mode of a connected car service terminal and a method for controlling a mode using the same. The system enables a driver to use a valet mode service by remotely executing a valet mode function with a terminal possessed by the driver after leaving a vehicle.

According to an embodiment, a method is provided for controlling a mode of a vehicle in a connected car service terminal driven by at least one processor. The method includes collecting information for determining a driver getting out of the vehicle, i.e., driver exit information. The method also includes checking whether the driver has left the vehicle based on the driver exit information. The method also includes transmitting a driver getting out notification signal, i.e., a driver exit notification signal informing that the driver has left the vehicle, to a connected car service server. The method also includes activating a valet mode in an inactivated state upon receiving a valet mode activation signal of the vehicle from the connected car service server.

The driver exit information may include plural information of vehicle starting state information, gear information, door state information, driver's seat belt fastening information, valet mode activation information, and information on whether the driver is on board.

Checking whether the driver has left the vehicle may include driving a timer for a predetermined time period when it is determined that the driver has left the vehicle.

Transmitting the driver exit notification signal may include generating the driver exit notification signal when the driven timer has expired and the driver has left the vehicle.

The method may further include, after activating the valet mode, collecting time information on when the valet mode was activated and collecting driving information of the vehicle after the valet mode was activated. The method may also include transmitting the collected information to the connected car service server.

According to another embodiment, a method is provided for controlling a mode of a vehicle in a user terminal driven by at least one processor. The method includes receiving a mode change request of a connected car service terminal equipped in the vehicle from a user through an application communicating with a connected car service server. The method also includes transmitting a mode change request signal of the mode change request input by the user to the connected car service server. The method also includes receiving mode execution information in which the mode of the connected car service terminal is switched to a valet mode, from the connected car service server.

Transmitting the mode change request signal may include receiving an input of a password for switching to the valet mode and encrypting the input password and inserting the encrypted password into the mode change request signal.

Transmitting the mode change request signal may further include receiving a pop-up message for valet mode activation of the connected car service terminal from the connected car service server and transmitting the mode change request signal to the connected car service server when the user selects a confirmation button for valet mode included in the pop-up message for valet mode activation.

According to still another embodiment, a vehicle is provided that is equipped with a connected car service terminal. The connected car service terminal includes a display that shows a plurality of buttons for audio, video, navigation, telematics (AVNT) functions and service for each function and includes a processor. Here, the processor collects driver exit information for determining a driver getting out, i.e., whether a driver has exited the vehicle. The processor also determines whether the driver has left the vehicle based on the driver exit information. The processor also transmits a driver exit notification signal to a linked connected car service server if the driver has left the vehicle. The processor also activates the valet mode upon receiving a valet mode activation signal from the connected car service server.

The processor may drive a timer for a predetermined time period, while determining whether the driver has left the vehicle whose ignition is on, i.e., determining whether the vehicle is running, based on the driver exit information.

Upon activating the valet mode, the processor may collect time information on when the valet mode is activated and may collect driving information of the vehicle after the valet mode is activated.

The processor may decrypt an encrypted password upon receiving a valet mode execution request signal including the encrypted password from the connected car service server. The processor may also check whether the decrypted password matches a preset password.

The processor may activate the valet mode when the decrypted password matches the preset password.

According to the present disclosure, even if a driver leaves a vehicle whose ignition is turned on, a connected car service terminal actively determines conditions and guides whether to execute a valet mode to a smart phone app of the driver.

In addition, when another user drives the vehicle, the owner can remotely execute the valet mode, so that personal information of the driver can be easily protected.

DETAILED DESCRIPTION OF THE EMBODIMENTS

Figure 1:
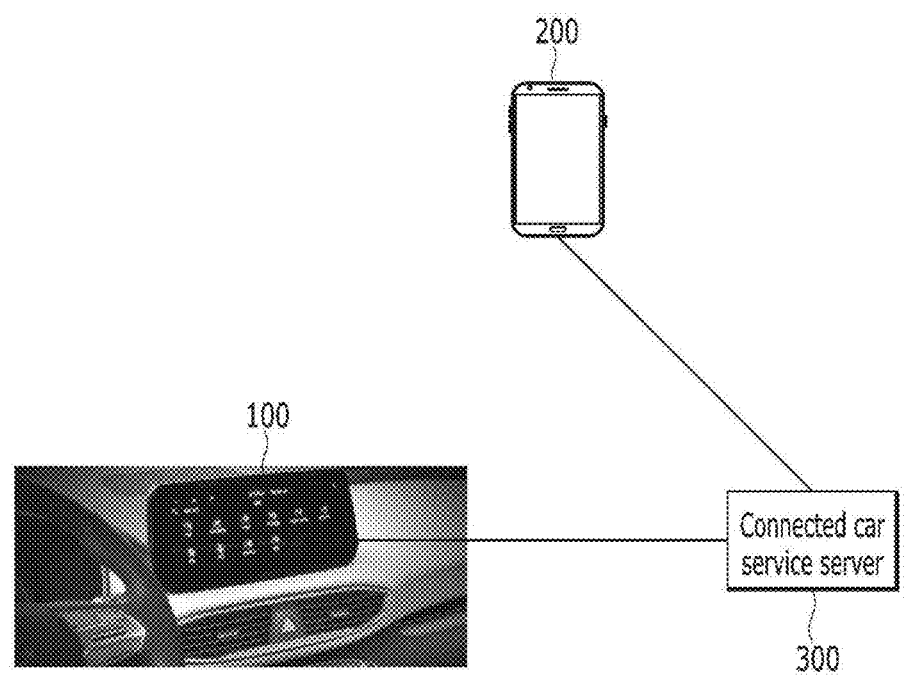
FIG. 1 is an example diagram of an environment to which a system for controlling a mode of a connected car service terminal according to an embodiment of the present disclosure is applied.

In the following detailed description, only certain example embodiments of the present disclosure have been shown and described, simply by way of illustration. As those having ordinary skill in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In the description, when a part is referred to "include" or "comprise" a certain component, it means that the part may further include other components rather than exclude other elements, unless the present disclosure specifically indicates otherwise. When a component, device, element, or the like of the present disclosure is described as having a purpose or performing an operation, function, or the like, the component, device, or element should be considered herein as being "configured to" meet that purpose or to perform that operation or function.

Hereinafter, a mode control system of a connected car service terminal and a mode control method using the same according to embodiments of the present disclosure are described with reference to the accompanying drawings.

FIG. 1 is an example diagram of an environment to which a system for controlling a mode of a connected car service terminal according to an embodiment of the present disclosure is applied.

As shown in FIG. 1, a mode control system includes a connected car service terminal 100 equipped in a vehicle and a user terminal 200 possessed by the driver. The connected car service terminal 100 and the user terminal 200 are linked via a connected car service server 300.

The connected car service terminal 10 is a terminal in which audio, video, navigation, telematics (AVNT) and a modem are combined. In other words, the connected car service terminal 100 is a terminal in which a modem for communicating with the connected car service server 300 is combined with an AVNT obtained from adding a telematics function to a general audio, video, navigation (AVN). In an embodiment of the present disclosure, a term "connected car service terminal" is used for convenience of description, but a connected car service may be processed within the AVNT in which a connected car service application is driven.

The connected car service terminal 100 provides the driver with various functions and information, such as vehicle-related information, regular check-up notification, anti-theft alarm function, emergency rescue, real time traffic information, weather and stock information, and vehicle remote control, using the telematics function. Various functions provided by the AVNT, being the connected car service terminal 100, are already known and are not limited to any one function in an embodiment of the present disclosure.

The connected car service terminal 100 checks whether the driver has left the vehicle based on various information for determining a driver getting out of the vehicle (hereinafter, referred to as 'driver exit information', for convenience of description). Here, the driver exit information includes vehicle starting state information, gear information, door state information, driver's seat belt fastening information, valet mode activation information, information on whether personal information of the driver (e.g., accumulated information of destinations, stored phone number information, and the like) are displayed via the connected car service terminal 100, information on whether the driver is on board, and the like.

In other words, the connected car service terminal 100 determines whether the driver has left the vehicle by checking whether the vehicle is started, whether a gear is in park (P) position or neutral (N) position, whether a state of a driver's door is changed, whether the driver's seat belt is fastened, whether the valet mode is inactivated, and/or whether the driver is on board with an in-vehicle camera. In an embodiment of the present disclosure, it is described that the above-described driver exit information is used for determining whether the driver has left, i.e., exited the vehicle. However, the information is not limited thereto.

The connected car service terminal 100 drives a timer equipped within the connected car service terminal 100 while starting to collect the driver exit information. The connected car service terminal 100 transmits a 'driver getting out' notification signal notifying that the driver has left the vehicle (hereinafter, referred to as a 'driver exit notification signal') to the connected car service server 300, when a time interval predetermined by the driven timer has expired. However, before the timer expires, the connected car service terminal 100 continuously checks whether conditions for driver getting out are changed.

In addition, upon receiving a valet mode request signal from the connected car service server 300, the connected car service terminal 100 activates the valet mode. Here, the valet mode is one of the functions provided by the AVNT, which is the connected car terminal 100 equipped in the vehicle. In an embodiment of the present disclosure, the valet mode that is one of the functions of the connected car service terminal 100 is described as one type of vehicle modes for convenience of description. Then, a valet mode activation signal notifying that the vehicle has been switched to the valet mode is transmitted to the connected car service server 300.

At this time, an encrypted password may be included in a valet mode request signal. If an encrypted password is included, the connected car service terminal 100 decrypts the encrypted password and checks whether the decrypted password matches a password preset in the connected car service terminal 100. Only when the two passwords match, the connected car service terminal 100 activates the valet mode and then transmits the valet mode activation signal to the connected car service server 300.

In an embodiment of the present disclosure, for convenience of description, the term 'valet mode' is used. However, since the valet mode is a function for preventing personal information of the driver from being exposed to another person, it may be referred to as a 'personal information protection mode'. However, there is no need to limit the term to any one such as 'vale mode' or 'personal information protection mode'.

After activating the valet mode, the connected car service terminal 100 collects vehicle state information, driving information after set to the valet mode, valet mode start time information, the highest speed information, and the like at predetermined time intervals. The connected car service terminal 100 transmits the collected information to the connected car service server 300. Using an application ("app") installed in the user terminal 200, the driver may receive vehicle state information after the valet mode is activated and check the received information.

Upon receiving a signal notifying that the driver has left the vehicle from the connected car service server 300, the user terminal 200 provides a pop-up message for valet mode activation to a user of the user terminal 200, namely the driver, via the app installed in the user terminal 200. In the pop-up message, a confirmation button (labeled as "OK") that enables activating the valet mode and a cancel button that does not activate the valet mode may be displayed.

When the confirmation button is pressed by the user, the user terminal 200 provide the connected car service server 300 with a signal notifying that the confirmation button is input (hereinafter, referred to as 'valet mode activation signal' for convenience of description) and location information of the user terminal 200.

In addition, when the user remotely executes the valet mode using the app installed in the user terminal 200, the user terminal 200 transmits a valet mode request signal to the connected car service server 300. At this time, the user terminal 200 may encrypt a password preset for the connected car service terminal 100, insert the encrypted password into the valet mode request signal, and transmit the valet mode request signal to the connected car service server 300.

Upon receiving a driver exit notification signal from the connected car service terminal 100, the connected car service server 300 transmits a push message notifying that the driver has left the vehicle. Upon receiving the valet mode activation signal from the user terminal 200, the connected car service server 300 transmits the valet mode activation signal to the connected car service terminal 100 to activate the valet mode.

The connected car service server 300 receives vehicle state information, driving information, time information, and the like at predetermined time intervals from the connected car service terminal 100 of the vehicle whose mode has been switched to the valet mode. When the user wants to check the received information using the user terminal 200, the received information is provided to the user for checking via the app installed in the user terminal 200.

In the above-described environment, a method for controlling a vehicle mode to be switched to a valet mode may be described with two embodiments.

A first embodiment is a method that a connected car service terminal 100 checks whether a driver has left a vehicle and displays a pop-up on a user terminal 200 of the driver to switch to a valet mode. A second embodiment is a method that enables a driver to remotely control the vehicle to switch to a valet mode using an app installed in a user terminal 200.

Two embodiments of a method for controlling a vehicle mode in the above-described environment are described with reference to FIGS. 2-4.

Figure 2:
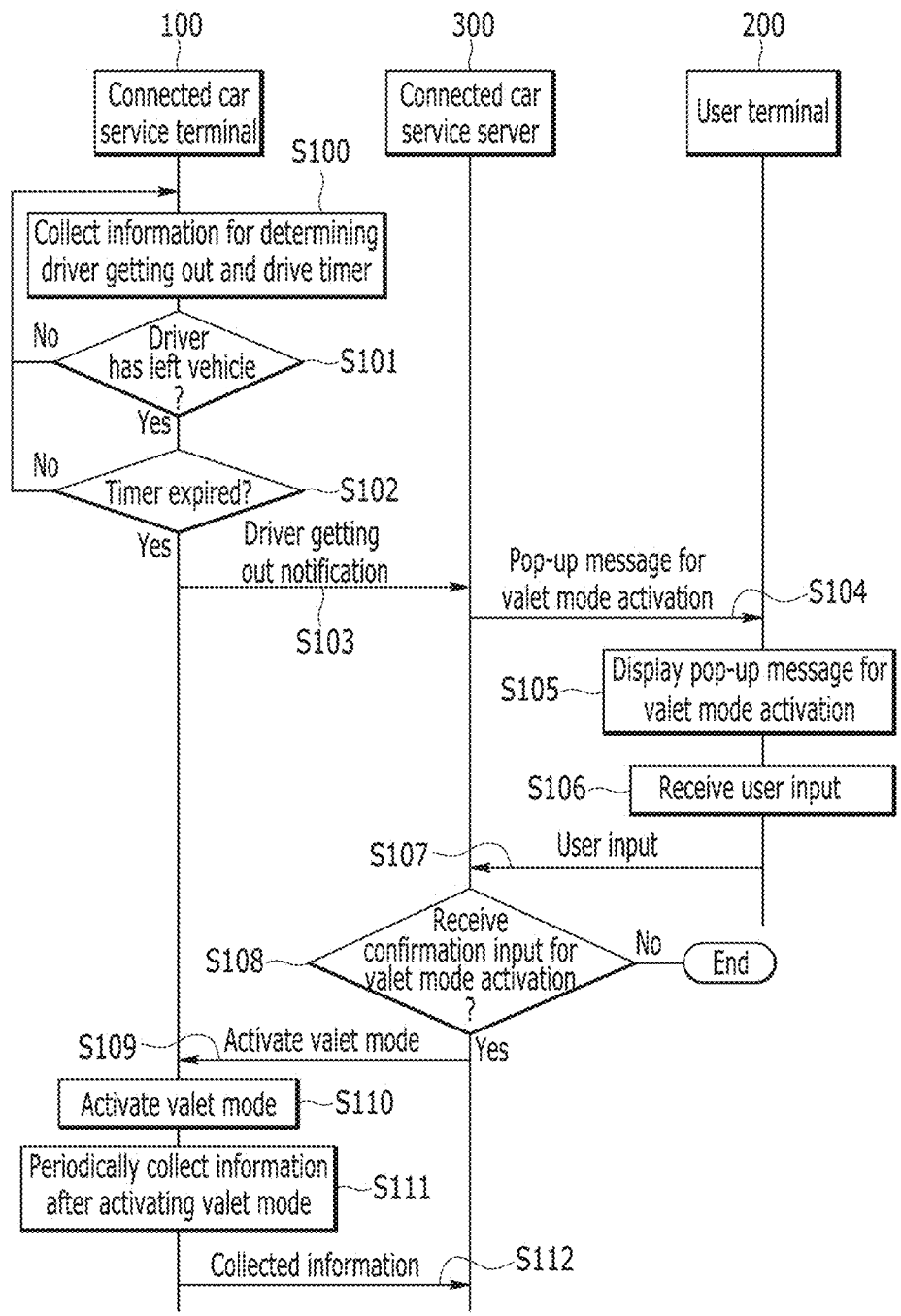
FIG. 2 is a flowchart showing a vehicle mode control method according to a first embodiment of the present disclosure.

FIG. 2 is a flowchart showing a vehicle mode control method according to the first embodiment of the present disclosure.

As shown in FIG. 2, the connected car service terminal 100 starts to collect driver exit information for determining a driver getting out from a moving vehicle and simultaneously makes the timer operate during a predetermined time period (S100). In an embodiment of the present disclosure, the timer may operate for 3 minutes, but it is not limited thereto.

The connected car service terminal 100 checks whether the driver has left the vehicle based on the collected driver exit information for determining a driver getting out (S101). Here, the driver exit information for determining a driver getting out includes plural information among vehicle start state information, gear information, door state information, seat belt fastening information of a driver's seat, valet mode activation information, information on whether personal information is being displayed via the connected car service terminal 100, information on whether the driver is on board, and the like.

If the driver has not left the vehicle (No in S101), the connected car service terminal 100 repeats the subsequent procedure from step S100. However, if it is determined that the driver has left the vehicle (Yes in S101), the connected car service terminal 100 checks whether the timer driven in step S100 has expired (S102).

If the timer has not yet expired (No in S102), the connected car service terminal 100 repeats the subsequent procedure from step S100. However, if the timer has expired (Yes in S102), the connected car service terminal 100 transmits a driver exit notification signal to the connected car service server 300 (S103).

At this time, the driver exit notification signal may include driver identification information of the driver linked to the vehicle. For this, identification information of the driver is set in the connected car service terminal 100 of the vehicle. The driver identification information may be any information that can be used for identifying the driver, such as phone number of a driver's terminal, an ID of the driver (e.g., resident registration number, nickname, e-mail).

Upon receiving a driver exit notification signal including driver identification information in step S103, the connected car service server 300 transmits a pop-up message for valet mode activation to a user terminal 200 possessed by the driver (S104). Here, the connected car service server 300 may map a phone number of the user terminal 200 corresponding to the driver identification information of each driver and may store and manage the mapped phone number. The connected car service server 300 transmits a pop-up message for valet mode activation using the phone number of the user terminal 200 mapped to the driver identification information included in the driver exit notification signal received in step S103.

Alternatively, if the driver identification information is the phone number of the user terminal 200, the connected car service server 300 may transmit a pop-up message for valet mode activation based on the driver identification information.

The user terminal 200 displays the pop-up message for valet mode activation received in step S104, so that the user, namely the driver, can recognize the received message (S105). Here, the pop-up message for valet mode activation includes a confirmation button by which the valet mode can be executed and a cancel button for canceling the execution of the valet mode. The pop-up message for valet mode activation may be displayed on an app installed on the user terminal 200 or may be displayed through a default message function provided by the user terminal 200.

When the user selects any one of the confirmation button or the cancel button after recognizing the pop-up message for valet mode activation, the user terminal 200 receives the user's selection as a user input (S106). The user terminal 200 transmits the user input received in step S106 to the connected car service server 300 (S107).

The connected car service server 300 checks whether the user input received in step S107 corresponds to the confirmation button for valet mode activation (S108). When information corresponding to the cancel button that does not request to activate the valet mode of the vehicle is included (No in S108), a procedure of activating the valet mode is terminated. However, when the user input includes information corresponding to the confirmation button that requests to activate the valet mode (Yes in S108), the connected car service server 300 requests the connected car service terminal 100 to activate the valet mode (S109).

The connected car service terminal 100 activates the valet mode according to the request from the connected car service server 300 (Sl10). Activation of the valet mode by the connected car service terminal 100 means that information provided to the driver currently driving the vehicle via the connected car service terminal 100 is blocked.

After activating the valet mode, the connected car service terminal 100 collects vehicle state information, driving information, time information, and the like according to a predetermined time interval (S111). The connected car service terminal 100 transmits the collected information to the connected car service server 300 (S112).

A method for determining whether the driver has left the vehicle in the connected car service terminal 100 in step 101, while the valet mode is automatically executed according to the above-described procedure after the driver has gotten out of the vehicle, is described with reference FIG. 3.

Figure 3:
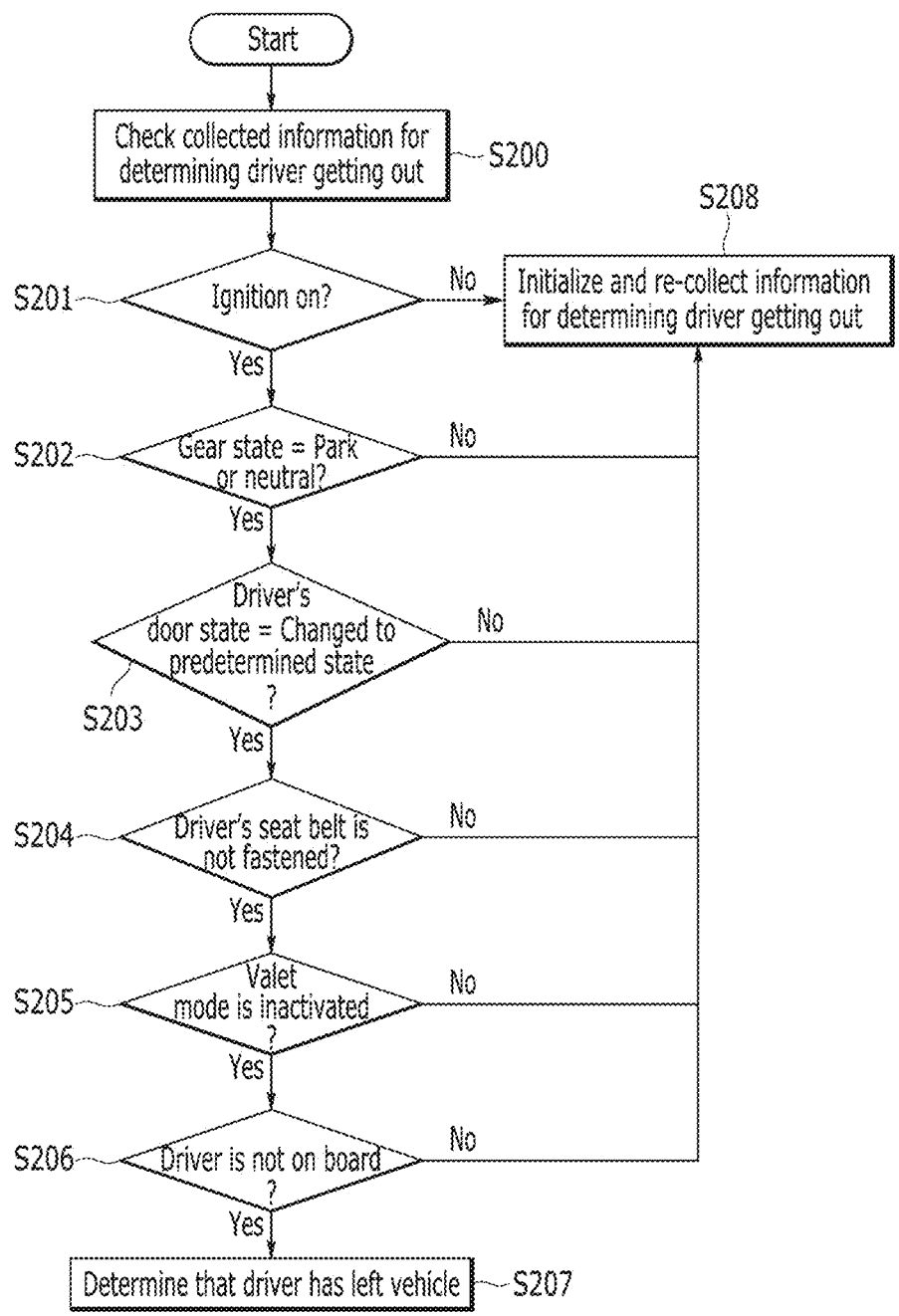
FIG. 3 is a flowchart showing a method for determining whether a driver has left a vehicle in a connected car service terminal according to a first embodiment of the present disclosure.

FIG. 3 is a flowchart showing a method for determining whether a driver has left a vehicle in an infotainment device according to an embodiment of the present disclosure.

A shown in FIG. 3, the connected car service terminal 100 collects diverse information from a vehicle whose ignition is turned on, i.e., a vehicle with the ignition on, a vehicle that is running, a vehicle with its engine running, or the like. Here, the connected car service terminal 100 may also collect driver exit information for determining a driver getting out.

The connected car service terminal 100 checks the collected driver exit information for determining s driver getting out (S200). Then, the connected car service terminal 100 checks whether an ignition of the vehicle is currently on or off (S201).

If the ignition is on (Yes in S201), the connected car service terminal 100 checks whether a gear state of the current vehicle is in any one of park position or neutral position (S202).

If a gear of the vehicle is in any one of the park position or neutral position (Yes in S202), the connected car service terminal 100 checks whether a state of the driver's door is changed according to a predetermined order (S203). Here, the predetermined order corresponds to a case in which a door state is switched to a closed state from an open state, or the door maintains an open state.

If the state of the driver's door is changed by a predetermined order (Yes in S203), the connected car service terminal 100 checks whether the driver's seat belt is not fastened (S204).

If the driver's seat belt is not fastened (Yes in S204), the connected car service terminal 100 checks whether a valet mode is currently inactivated (S205).

If the valet mode is inactivated (Yes in S205), the connected car service terminal 100 checks whether the driver is on board using an image taken by a camera equipped in the vehicle (S206). The connected car service terminal 100 may check whether the driver is on board by using a seating sensor (e.g., weight detection sensor) of the drivers seat instead of or in addition to the in-vehicle camera. Since there are various methods for the connected car service terminal 100 to determine whether the driver is on board, an embodiment of the present disclosure is not limited to any one method.

According to the above-described checking procedure, if the ignition is on (Yes in S201), the gear is in any one of the park position or the neutral position (Yes in S202), the state of the driver's door is changed to a predetermined state (Yes in S203), the driver's seat belt is not fastened (Yes in S204), and the driver is not on board with user account information being displayed and the valet mode being inactivated (Yes in S205 and Yes in S206), the connected car service terminal 100 determines that the driver has left the vehicle (S207).

However, if any one of the above-described determination procedures is not satisfied (No), the connected car service terminal 100 initializes the determination procedure and re-collects the driver exit information for determining a driver getting out (S208).

Hereinafter, a method for controlling a vehicle mode according to another embodiment of the present disclosure is described with reference to FIG. 4.

Figure 4:
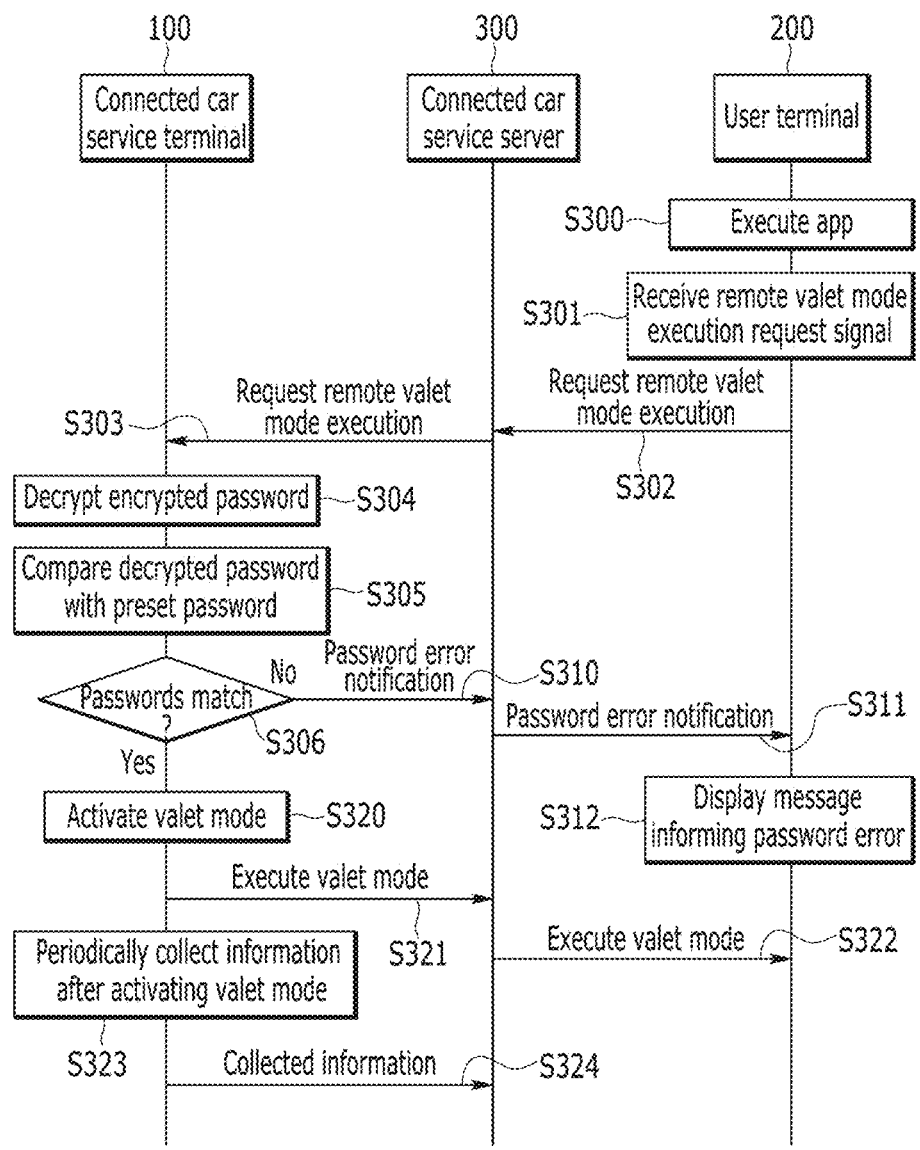
FIG. 4 is a flowchart showing a vehicle mode control method according to a second embodiment of the present disclosure.

FIG. 4 is a flowchart showing a vehicle mode control method according to a second embodiment of the present disclosure.

As shown in FIG. 4, when a user other than a driver of a vehicle drives the vehicle, the driver executes a valet mode setting app installed in a user terminal 200 possessed by the driver (S300). When a remote valet mode execution request button displayed on the valet mode setting app is selected, the user terminal 200 receives an input from the remote valet mode execution request button selected by the driver as a remote valet mode execution request signal (S301).

The user terminal 200 transmits the remote valet mode execution request signal received in step S301 to a connected car service server 300 (S302). At this time, the driver may request to execute a remote valet mode by inputting a password set for a connected car service terminal 100 of the vehicle. Then, the user terminal 200 may encrypt the password input by the driver, insert the encrypted password into the remote valet mode execution request signal, and then transmit the request signal to the connected car service server 300.

The connected car service server 300 transmits the remote valet mode execution request signal received in step S302 to the connected car service terminal 100 (S303). Upon receiving the remote valet mode execution request signal, the connected car service terminal 100 decrypts the encrypted password inserted into the signal (S304).

Then, the connected car service terminal 100 compares the decrypted password with the password preset in the connected car service terminal 100 (S305) and determines whether the two passwords match (S306). If the two passwords do not match (No in S306), the connected car service terminal 100 transmits a password error notification signal to the connected car service server 300 (S310).

The connected car service server 300 transmits the password error notification signal received in step S310 to the user terminal 200 (S311). Then, the user terminal 200 displays the received password error notification signal via the app executed in step S300, so that the driver can recognize the signal (S312).

On the other hand, if it is determined that the two passwords match (Yes in S306), the connected car service terminal 100 activates the valet mode (S320). Since there are various methods for the connected car service terminal 100 to activate the valet mode in an inactivated state, an embodiment of the present disclosure does not limit to any one method.

The connected car service terminal 100 transmits a valet mode execution signal, notifying that the valet mode was activated, to the connected car service server 300 (S321). For the driver's recognition, the connected car service server 300 transmits the valet mode execution signal received in step S321 to the user terminal 200 (S322).

After activating the valet mode in step S320, the connected car service terminal 100 collects vehicle state information, driving information, time information, and/or the like at predetermined time intervals (S323). The connected car service terminal 100 transmits the collected information to the connected car service server 300 (S324).

Example screens of the user terminal 200 displayed when the vehicle mode is controlled according to procedures of the above-described first and second embodiments are described with reference to FIG. 5 and FIG. 6.

Figure 5:
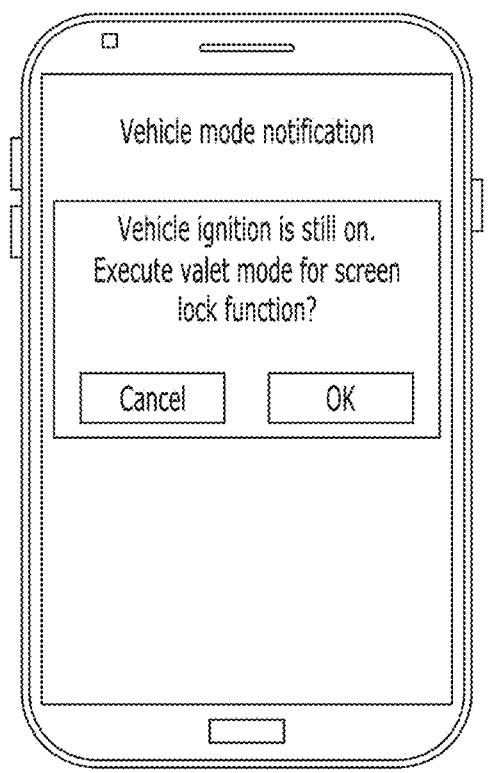
FIG. 5 and FIG. 6 are example diagrams of screens for controlling a vehicle mode via a terminal according to embodiments of the present disclosure.
Figure 6:
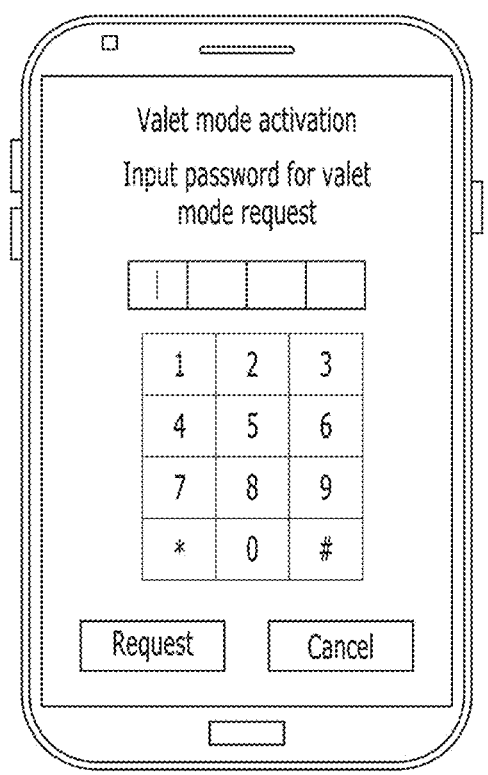

FIG. 5 and FIG. 6 are example diagrams of screens for controlling a vehicle mode via a terminal according to embodiments of the present disclosure.

FIG. 5 is an example diagram of a screen for controlling the vehicle mode via the user terminal 200 according to the first embodiment of the present disclosure. FIG. 6 is an example diagram of a screen for controlling the vehicle mode via the user terminal 200 according to the second embodiment of the present disclosure.

As shown in FIG. 5, if a driver left a vehicle while the driver put a gear of the vehicle in a park position or a neutral position and did not turn the ignition off, a connected car service terminal 100 determines that the driver has left the vehicle. Then, the connected car service terminal 100 informs that the ignition of the vehicle is currently on to the user terminal 200 possessed by the driver and transmits a pop-up message notifying that a screen lock function, namely a valet mode, needs to be executed.

When the driver selects a confirmation button in the pop-up message, the connected car service terminal 100 prevents account information of the driver from being exposed through the screen by switching the vehicle mode to the valet mode. On the other hand, when the driver gets on board again and wants to cancel the valet mode, the valet mode can be cancelled by inputting a preset password through the screen of the connected car service terminal 100.

On the other hand, as shown in FIG. 6, the driver may remotely activate a valet mode of a vehicle through an app installed in the user terminal 200 when another user than the driver drives the vehicle, such as valet driving and valet parking. At this time, the driver may request to activate the valet mode by inputting a preset password into the connected car service terminal 100.

Figure 7:
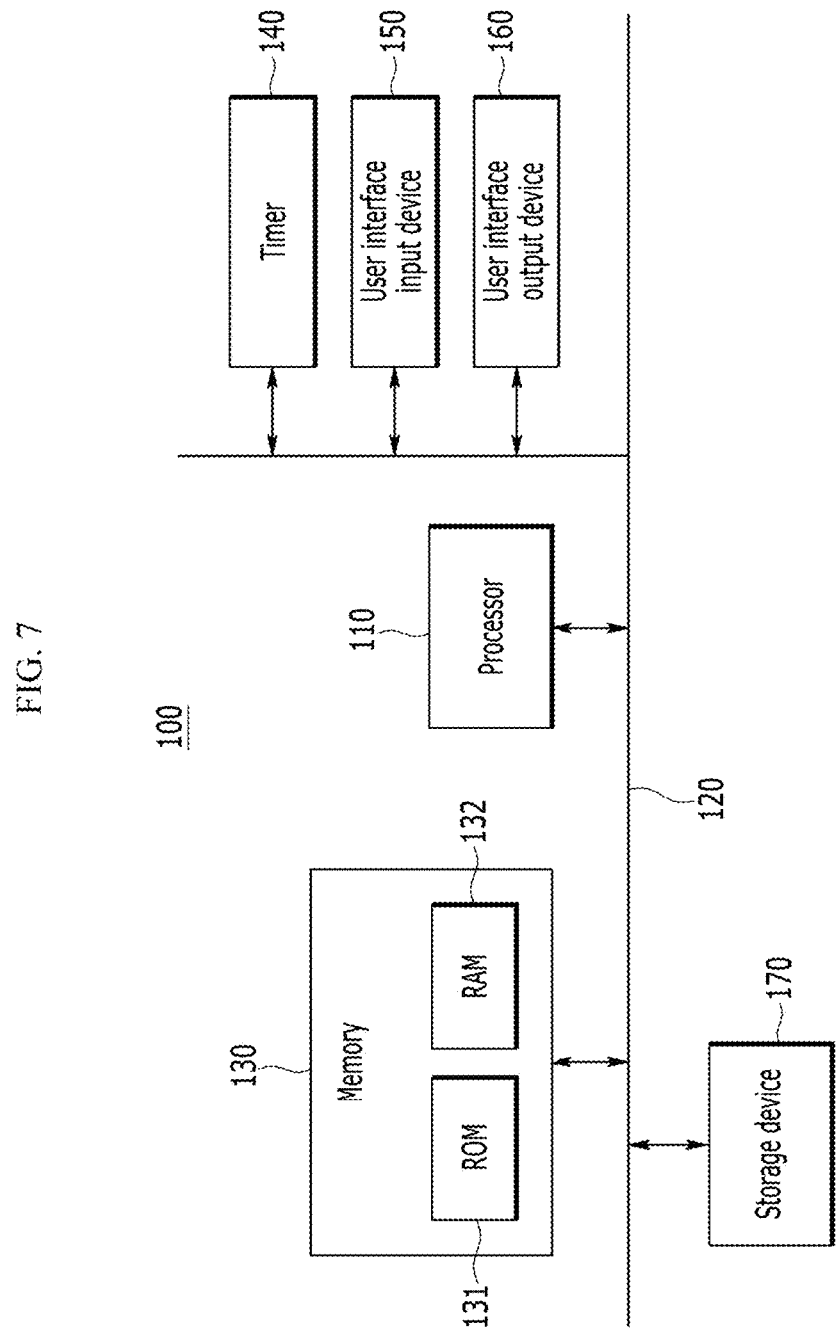
FIG. 7 is a configuration diagram of a connected car service terminal according to an embodiment of the present disclosure.

FIG. 7 is a configuration diagram of a connected car service terminal according to an embodiment of the present disclosure.

As shown in FIG. 7, a connected car service terminal 100 according to an embodiment of the present disclosure may be implemented as a computer system.

The computer system may include at least one of a processor 110, a memory 130, a timer 140, a user interface input device 150, a user interface output device 160, and a storage device 170, which communicate with each other through a bus 120.

The processor 110 may be a central processing unit (CPU) or a semiconductor device that executes instructions stored in the memory 130 or the storage device 170. The processor 110 may be configured to implement the functions and methods that are described above with reference to FIGS. 2-4.

The memory 130 and the storage device 170 may include various types of volatile or non-volatile storage media. For example, the memory 130 may include a read only memory (ROM) 131 and a random access memory (RAM) 132. In an embodiment of the present disclosure, the memory 130 may be positioned inside or outside the processor 110, and the memory 130 may be connected to the processor 110 via various known means.

The timer 140 may be driven for a predetermined time period according to a control of the processor 110.

Although the embodiments of the present disclosure have been described in detail above, the scope of the present disclosure is not limited thereto. Various modifications and improvements by those having ordinary skill in the art using the basic concept of the present disclosure defined in the following claims are also provided. The various modifications and improvements also fall within the scope and spirit of the following claims and equivalents thereto.

What is claimed is:

1. A method for controlling a mode of a vehicle in a connected car service terminal driven by at least one processor, the method comprising:
    collecting driver exit information for determining a driver getting out of the vehicle;
    determining whether the driver has left the vehicle based on the driver exit information;

transmitting a driver exit notification signal informing that the driver has left the vehicle to a connected car service server;

receiving a valet mode activation signal of the vehicle from the connected car service server; and activating a valet mode in an inactivated state to control the vehicle to execute the valet mode of the vehicle, wherein determining whether the driver has left the vehicle comprise determining that the driver has left the vehicle when the vehicle is started, a gear is in any one of a park position or a neutral position, and a seat belt of the driver is not fastened.

2. The method of claim 1, wherein the driver exit information further includes plural information of vehicle starting state information, gear information, door state information, driver's seat belt fastening information, valet mode activation information, and information on whether the driver is on board.

3. The method of claim 1, wherein determining whether the driver has left the vehicle comprises driving a timer for a predetermined time period when it is determined that the driver has left the vehicle.

4. The method of claim 3, wherein transmitting the driver exit notification signal comprises generating the driver exit notification signal when the driven timer has expired and the driver has left the vehicle.

5. The method of claim 1, further comprising, after activating the valet mode, collecting time information on when the valet mode was activated and driving information of the vehicle after the valet mode was activated and transmitting the collected information to the connected car service server.

6. A method for controlling a mode of a vehicle in a user terminal driven by at least one processor, the method comprising:

receiving a mode change request of a connected car service terminal equipped in the vehicle from a user through an application communicating with a connected car service server;

transmitting a mode change request signal of the mode change request input by the user to the connected car service server;

receiving mode execution information in which the mode of the connected car service terminal is switched to a valet mode, from the connected car service server;

receiving a pop-up message for valet mode activation of the connected car service terminal from the connected car service server; and transmitting the mode change request signal to the connected car service server when the user selects a confirmation button for valet mode included in the pop-up message for valet mode activation.

7. The method of claim 6, wherein transmitting the mode change request signal comprises:

receiving an input of a password for switching to the valet mode; and encrypting the input password and inserting the encrypted password into the mode change request signal.

8. A connected car service terminal equipped in a vehicle, the connected car service terminal comprising:

a display that shows a plurality of buttons for audio, video, navigation, telematics (AVNT) functions and service for each function; and a processor, wherein the processor is configured to collect driver exit information for determining a driver getting out of the vehicle, determine whether the driver has left the vehicle based on the driver exit information, transmit a driver exit notification signal to a linked connected car service server when the driver has left the vehicle, receive a valet mode activation signal of the vehicle from the connected car service server, and activate a valet mode to control the vehicle to execute the valet mode of the vehicle, wherein the process determines that the driver has left the vehicle when the vehicle is started, a gear is in any one of a park position or a neutral position, and a seat belt of the driver is not fastened.

9. The connected car service terminal of claim 8, wherein the processor drives a timer for a predetermined time period, while determining whether the driver has left the vehicle while an ignition of the vehicle is on, based on the driver exit information.

10. The connected car service terminal of claim 9, wherein, upon activating the valet mode, the processor collects time information on when the valet mode is activated and driving information of the vehicle after the valet mode is activated.

11. The connected car service terminal of claim 10, wherein the processor decrypts an encrypted password upon receiving a valet mode execution request signal including the encrypted password from the connected car service server and wherein the processor checks whether the decrypted password matches a preset password.

12. The connected car service terminal of claim 11, wherein the processor activates the valet mode when the decrypted password matches the preset password.

* * * * *